Nov. 12, 1968 K. HINRICHS 3,411,097
SYSTEM FOR REDUCING SUMMING JUNCTION CAPACITANCE IN PROGRAMMED ANALOG COMPUTERS
Filed Feb. 2, 1966
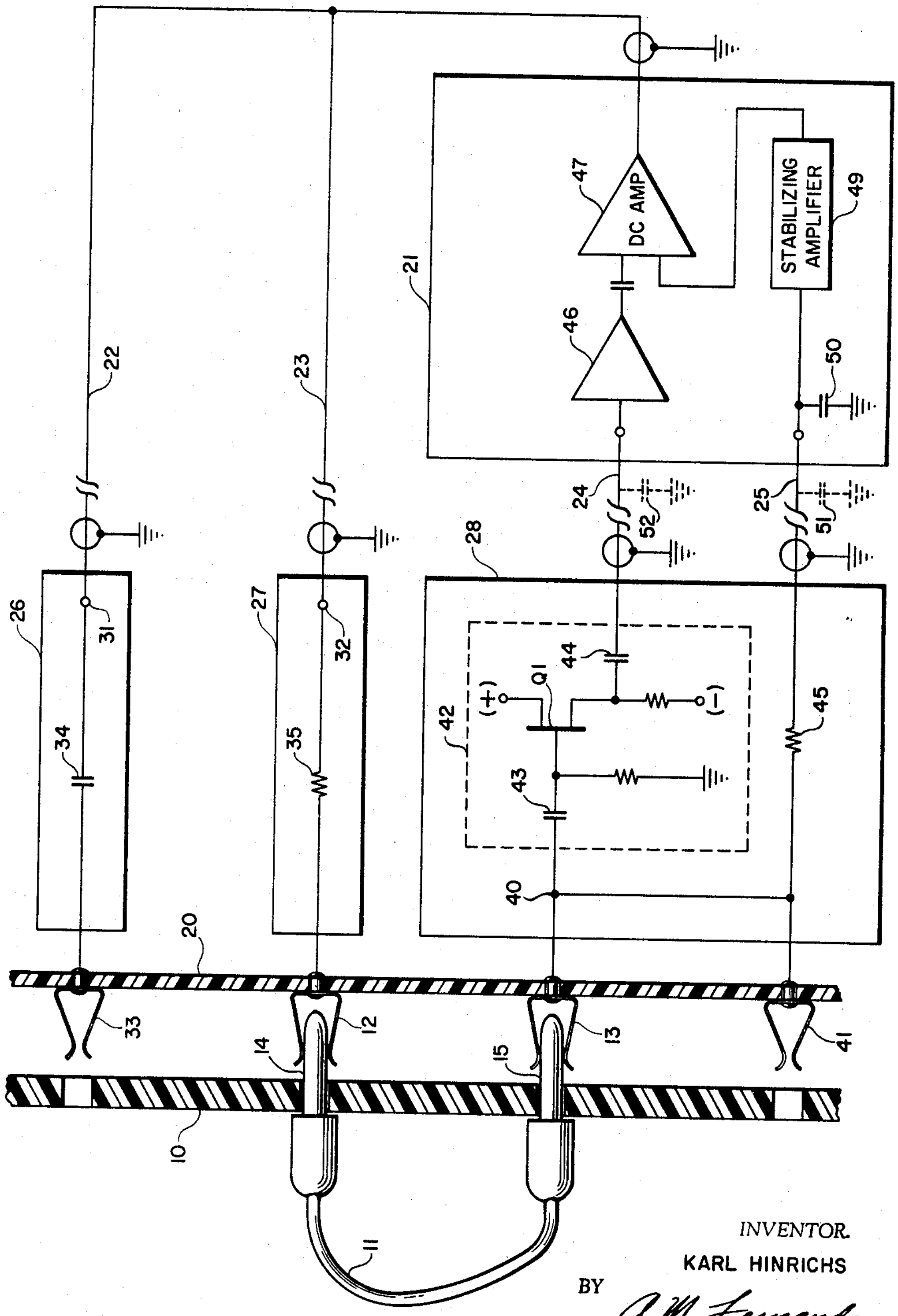
INVENTOR.
KARL HINRICHS
BY A. M. Fernandez
ATTORNEY 3,411,097

SYSTEM FOR REDUCING SUMMING JUNCTION CAPACITANCE IN PROGRAMMED ANALOG COMPUTERS

Karl Hinrichs, Fullerton, Calif., assignor to Beckman Instruments, Inc., a corporation of California Filed Feb. 2, 1966, Ser. No. 524,613
10 Claims. (Cl. 330—9)

This invention relates to patchboard programmed analog computers, and more particularly to a system for reducing the capacitance appearing between the summing junction of an operational amplifier and ground when relatively long shielded leads are employed to connect an input network to the amplifier through a patchboard.

Patchboard systems are commonly provided in analog computers to facilitate programming problems. Such a system generally consists of a board having a matrix of holes into which patch-cord plugs are inserted while the board is removed from the computer. Once the operator has programmed his problem with patch cords for interconnecting computing components, such as operational amplifiers, input networks, multipliers, function generators, etc., the patchboard is put in place in a patchbay. For each patchboard hole, there is in the patchbay a contact adapted to make contact with a patch-cord plug when the patchboard is put in place and connected to an input or output terminal of a computing element.

Input networks are generally mounted on a card placed just behind the contact in the patchbay so that connections may be made to them almost directly through the patchboard. However, other computing components, such as operational amplifiers, must be mounted further away, usually several feet away from the patchbay, in order to have sufficient space for them, and to make them readily accessible for adjustments and repairs.

To avoid cross talk, shielded leads are employed to connect input and output terminals of those remotely situated components to patchbay contacts. Such shielded leads introduce 20 to 50 picofarads capacity per foot of length so that, in the case of operational amplifiers, summing junction capacitance is introduced, often as great as 400 picofarads.

Summing junction capacitance reduces the available open loop gain of an operational amplifier, i.e., reduces the feedback voltage from the output to the input of an operational amplifier due to its voltage dividing action at the summing junction. This degrades performance of the operational amplifier in many ways. For instance, it reduces the bandwidth and stability margin of the amplifier due to the additional roll-off network comprising the summing junction capacitance and the feedback network. It also reduces the capacitive load which can be connected to the amplifier, and increases the restriction or special requirements imposed on the design of the feedback network. Thus, summing junction capacitance creates many problems in the design and use of operational amplifiers. To reduce the problems, it has been common practice to connect a large capacitor (0.01 to 0.001 microfarad) from the input terminal of the operational amplifier to ground so that when a shielded cable of some length is connected to it, the additional summing junction capacitance will be negligible.

Greater computational bandwidths are now required for higher computational speeds, or higher accuracy, or both higher speeds and accuracy. If a large fixed capacitor is connected to the input terminal to reduce design problems, the input signal is greatly attenuated at high frequencies, even in an integrator where there is no attenuation in the input network as such but where there is nevertheless attenuation across a series resistor required between the summing junction and the input terminal to assure stability at high frequencies, thereby degrading both speed and accuracy. Accordingly, it has become common practice to minimize the summing junction capacitance in an integrator by connecting the series resistor directly to the summing junction in the patchbay.

Other techniques have been suggested to minimize or compensate for the summing junction capacitance, such as using a feedback shunt capacitor. However, these techniques for minimizing or compensating for the summing junction capacitance which attenuate the signal are undesirable because they degrade the signal-to-noise ratio and make the amplifier design more expensive. Similarly, these techniques which introduce or shift a pole in the transfer function of the amplifier are undesirable because of the many additional compensation networks which are then required to restore the desired transfer function, often with some attenuation of the signal, and again with some degradation of the signal-to-noise ratio.

The principal object of this invention is to reduce the summing junction capacitance of an operational amplifier used in a patchboard programmed computer without employing fixed capacitors and compensating networks. This and other objects of the invention are achieved by employing a preamplifier board mounted at or near the patchbay to eliminate the use of a shielded lead connected to the summing junction at the patchbay contact, or to at least reduce the length of any such shielded lead, thereby either eliminating summing junction capacitance or reducing it by at least a factor of 10. The operational amplifier proper may then be located anywhere in the computer in the usual manner and connected to the preamplifier by a shielded lead. Capacitors are employed in the preamplifier to couple from and to the respective input and output terminals thereof to provide a high-pass circuit between the summing junction and the operational amplifier. A low-pass circuit from the summing junction to the operational amplifier is provided through a resistor mounted on the preamplifier board.

This invention is described with particularity in the appended claims which form a part of the specification. However, for a better understanding of the invention and its advantages, reference should be made to the following detailed description and the accompanying drawing in which the sole figure is a schematic diagram of one embodiment illustrating the principles of the invention.

Referring now to the drawing, a patchboard 10 of the type employed to program analog computers is shown with a patch cord 11 interconnecting two contacts 12 and 13 in a patchbay adapted to receive the patchboard with the patch cords already in place. The patchboard is illustrated as being of the nonmetallic type for simplicity, but it should be understood that it may also be of the metallic type, particularly if the patch cords are shielded leads, the metallic patchboard then providing a convenient way of grounding the shields in a manner well known to those skilled in the art. The tapered tips 14 and 15 at the ends of the patch cord 11 protrude through the patchboard to engage the spring contacts 12 and 13.

A connector board 20 is fixably attached to a rack (not shown) in a cabinet housing the analog computer components, and is provided with means (not shown) adapted to receive the patchboard in such a manner that the tapered tips of patch cords, such as the tips 14 and 15, will make appropriate electrical connections with spring contacts, such as the contacts 12 and 13. The computing components are mounted on circuit boards, such as an operational amplifier mounted on a circuit board 21, and the circuit boards are in turn mounted in cabinet racks. Shielded leads are then employed to connect terminals of the computer components to contacts on the connector board 20, such as leads 22 and 23 connecting the output terminal of the computing component on the circuit board 21 to the connector board 20 and shielded leads 24 and 25 connecting the input of the computing component on the circuit board 21 to the connector board 20 via circuit boards 26, 27 and 28. It should be particularly noted that input terminals of the computing component on the circuit board 21 are not connected directly to contacts on the connector board 20 by shielded leads as they were in the prior art, but are instead connected to those contacts through the network on the circuit board 28.

The operational amplifier mounted on the circuit board 21 is normally employed as either a summer or an integrator. Accordingly, it is connected to a pair of output terminals 31 and 32 located on the circuit boards 26 and 27 by the shielded leads 22 and 23. A capacitor is provided on the circuit board 26 to couple the output terminal 31 to a contact 33 on the connector board 20, and a resistor 35 is provided on the circuit board 27 to couple the output terminal 32 to the contact 12. In that manner, the operational amplifier mounted on the circuit board 21 is adapted to be used as an integrator or a summer. For example, to be used as a summer, the patch cord 11 is employed to connect the contact 12 to a summing junction 40 mounted on the circuit board 28 via the contact 13 in the manner shown. At least one additional contact, such as the contact 41, is mounted on the connector board 20 and connected to the summing junction 40 in order to be able to connect an input network thereto as required by the particular problem. These connections may also be made by remote-controlled relays or electronic switches, not shown, in a manner familiar in the art.

In accordance with the present invention, a preamplifier 42 is provided on the circuit board 28 mounted immediately behind the connector board 20 in the patchbay. The preamplifier may consist of simply a single stage utilizing, for example, a field-effect transistor $Q_1$ connected in such a configuration as to function as a current buffer or impedance transformer with an output impedance capable of driving the shielded lead 24. Coupling capacitors 43 and 44 on the input and output terminals of the transistor $Q_1$ function as direct current blocking capacitors so that any drift introduced by the preamplifier is not transfered to the rest of the system. Similarly, a degree of voltage gain may be employed in the preamplifier to assist the operational amplifier in better noise and loop gain performance.

A resistor 45 is mounted on the circuit board 28 in parallel with the preamplifier 42 to provide a low-pass circuit from the summing junction 40 to the operational amplifier. In that manner two signal paths are provided on the circuit board 28 from the summing junction 40 to the operational amplifier, one path being a high-pass circuit comprising the preamplifier 42 and the other path being the low-pass circuit comprising the resistor 45, and filter capacitance to be described more fully hereinafter. The shielded lines 24 and 25 complete the signal paths to the operational amplifier. The capacitor 44 is normally included in operational amplifiers in order to block D.C. current at the input stage of the operational amplifier, which may be a high gain A.C. amplifier 46 capacitively coupled to a main amplifier 47, because such current would cause an error by flowing in the input summing networks. Alternatively, only a high-pass filter may be employed in place of the A.C. amplifier 46. In either case, the preamplifier 42 facilitates design of the operational amplifier by substantially reducing summing junction capacitance.

Since the output of the preamplifier 42 and the input of the A.C. amplifier 46 are D.C.-isolated, the signal through the low-pass circuit, namely the resistor 45, could be transmitted to the stabilizing amplifier 49 through the shielded lead 24 also. However, use of the two shielded leads 24 and 25 can permit more independence in the choice of polarities and gains in preamplifier 42, stabilizing amplifier 49 and amplifier 46. To facilitate understanding the present invention, these separate shielded leads are shown.

In a drift-stabilized operational amplifier, it is common practice to employ a stabilizing amplifier having a negative gain, such as a modulated-carrier type D.C. amplifier in which the input signal is used to modulate an A.C. carrier signal and the modulated A.C. carrier signal is amplified by means of a conventional A.C. amplifier which may be designed to be virtually drift free. The amplified A.C. signal is then demodulated to provide an amplified D.C. signal which is combined with the input signal in the operational amplifier in a manner well known to those skilled in the art, such as by a differential amplifier stage at the input of the main amplifier 47.

Reference is here made to stabilizing amplifier 49 in the operational amplifier on the circuit board 21 for the purpose of calling attention to an associated low-pass input filter, comprising a capacitor 50 and the resistor 45 on the circuit board 28 since placement of the resistor 45 on the circuit board 28 directly behind the connector board 20 is an important feature of the present invention. It should be noted that in a drift stabilized operational amplifier, the stabilizing amplifier normally includes a low-pass filter. By placing the input resistor 45 of that filter on the circuit board 28, and connecting it directly to the summing junction 40, no summing-junction capacitance is introduced by the low-pass circuit, just as there is no summing-junction capacitance introduced by the high-pass circuit. The shielded line 25 will introduce capacitance 51 between it and ground, but that capacitance is in parallel with the filter capacitor 50 which typically has a much larger capacitance of 0.1 microfarad. Accordingly, the capacitance 51 introduced by the shielded line 25 of only a few hundred picofarads is greatly reduced in importance.

In the high-pass circuit, there is capacitance 52 between the shielded line 24 and ground but the preamplifier current gain drives it with negligible current required at the input of the preamplifier 42, so that there will be little change on the overall open-loop response of the operational amplifier. Thus, the circuit mounted on the board 28 immediately behind the connector board 20 eliminates summing junction capacitance to improve both the bandwidth and the stability margin of the operational amplifier when the operational amplifier is installed in the computer in a location remote from the patchbay. To conveniently mount many circuits immediately behind the connector board 20 in that manner, the circuits can be microminiaturized by using integrated circuit techniques.

From the foregoing it may be readily appreciated that the summing junction capacitance is substantially reduced, and that except for the capacitance of the short connection between the contact 13 and the summing junction 40, and the capacitance of other connections such as the patch cord 11 connecting the feedback resistor 35 to the summing junction 40, the summing junction capacitance is reduced to virtually zero, and the distributed capacitances 51 and 52 of the shielded leads are greatly reduced in importance in both the design and performance of the operational amplifier. In practice all of the circuit boards 26, 27 and 28 may be combined and so situated behind the patchbay that shielded leads of a few inches would be required to make the requisite connections to the connector board 20, but the summing junction capacitance resulting from such an arrangement would still be less than it would be without the use of the present invention by a factor of at least ten.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What I claim is:

1. In a patchboard programmed analog computer, a system for reducing capacitance between a summing junction at the patchbay and a remote operational amplifier connected to the summing junction by an extended electrical connecting means, comprising:

a high-pass circuit connected in series with said extended electrical connecting means and connected directly to said summing junction at the patchbay, said circuit including an amplifier having its input terminal connected to said summing junction and its output terminal connected to said extended electrical connecting means, and a low-pass circuit connected in parallel with said high-pass circuit and in series with said extended electrical connecting means, and connected directly to said summing junction at the patchbay.

2. In a patchboard programmed analog computer, the combination as defined in claim 1 wherein said high-pass circuit amplifier includes capacitive coupling at the input and output thereof.

3. In a patchboard programmed analog computer, the combination as defined in claim 2 wherein said low-pass circuit comprises a series resistor connected between said summing junction and said extended electrical connecting means in combination with a capacitor in parallel with distributed capacitance of said extended electrical connecting means to ground.

4. In a patchboard programmed analog computer, the combination as defined in claim 1 wherein said operational amplifier comprises:

a stabilizing amplifier having an input terminal connected to said low-pass circuit, and a differential amplifier having one input terminal thereof coupled to said extended electrical connecting means and another input terminal thereof connected to the output of said stabilizing amplifier.

5. In a patchboard programmed analog computer, the combination as defined by claim 4 wherein said one input terminal of said differential amplifier is coupled to said high-pass circuit by a high-gain A.C. amplifier.

6. In a patchboard programmed analog computer, the combination as defined in claim 5 wherein said low-pass circuit comprises a series resistor connected between said summing junction and said extended electrical connecting means in combination with a capacitor in parallel with distributed capacitance of said extended electrical connecting means to ground.

7. In a patchboard programmed analog computer, the combination as defined in claim 4 wherein said extended electrical connecting means comprises a shielded lead.

8. In a patchboard programmed analog computer, the combination as defined in claim 7 wherein said shielded lead is divided into two sections, one section connecting said high-pass circuit to the operational amplifier and the other section connecting said low-pass circuit to said stabilizing amplifier of the operational amplifier.

9. In a patchboard programmed analog computer, the combination as defined in claim 1 wherein the amplifier of said high-pass circuit comprises a single-stage, field-effect transistor connected in a configuration for positive gain of approximately unity with capacitive coupling at the input and output thereof.

10. In a patchboard programmed analog computer, the combination as defined in claim 9 wherein a feedback circuit is connected to the output of the operational amplifier by an extended electrical connection and mounted at the patchbay for direct connection to said summing junction with a patch cord.

References Cited

UNITED STATES PATENTS 3,193,681 7/1965 Schwarz ----------- 250—83.3

NATHAN KAUFMAN, *Primary Examiner.*